United States Patent
Jones et al.

(10) Patent No.: US 11,809,323 B1
(45) Date of Patent: Nov. 7, 2023

(54) MAINTAINING REAL-TIME CACHE COHERENCY DURING DISTRIBUTED COMPUTATIONAL FUNCTIONS

(71) Applicant: Seagate Technology LLC, Fremont, CA (US)

(72) Inventors: Marc Timothy Jones, Longmont, CO (US); David Jerome Allen, Monument, CO (US); Steven Williams, Longmont, CO (US); Jason Matthew Feist, Minneapolis, MN (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 17/846,388

(22) Filed: Jun. 22, 2022

(51) Int. Cl.
*G06F 12/0815* (2016.01)
*G06F 12/0817* (2016.01)

(52) U.S. Cl.
CPC ...... *G06F 12/0828* (2013.01); *G06F 12/0815* (2013.01); *G06F 2212/621* (2013.01)

(58) Field of Classification Search
None
See application file for complete search history.

(56) References Cited

U.S. PATENT DOCUMENTS

| | | |
|---|---|---|
| 10,394,746 B2 | 8/2019 | Kachare et al. |
| 10,929,175 B2 | 2/2021 | Goyal et al. |
| 10,944,660 B2 | 3/2021 | Hurson et al. |
| 11,017,127 B2 | 5/2021 | Secatch et al. |
| 2015/0032968 A1* | 1/2015 | Heidelberger ...... G06F 12/0888 711/138 |
| 2019/0235777 A1 | 8/2019 | Wang et al. |
| 2020/0028552 A1 | 1/2020 | Salem et al. |
| 2023/0027648 A1* | 1/2023 | Chang ............... G06F 16/24552 |
| 2023/0146611 A1* | 5/2023 | Li ...................... G06F 18/2148 345/522 |

FOREIGN PATENT DOCUMENTS

WO  WO-2017209883 A1 * 12/2017 ........... G06F 12/0811

OTHER PUBLICATIONS

Lee et al. "BSSync: Processing Near Memory for Machine Learning Workloads with Bounded Staleness Consistency Models." 2015. IEEE. PACT 2015. pp. 241-252.*

* cited by examiner

*Primary Examiner* — Nathan Sadler
(74) *Attorney, Agent, or Firm* — Hall Estill Law Firm; Randall K. McCarthy

(57) ABSTRACT

Apparatus and method for maintaining real-time coherency between a local cache of a target device and a client cache of a source device during execution of a distributed computational function. In some embodiments, a source device, such as a host computer, is coupled via a network interface to a target device, such as a data storage device. A storage compute function (SCF) command is transferred from the source device to the target device. A local cache of the target device accumulates output data during the execution of an associated SCF over an execution time interval. Real-time coherency is maintained between the contents of the local cache and a client cache of the source device, so that the client cache retains continuously updated copies of the contents of the local cache during execution of the SCF. The coherency can be carried out on a time-based granularity or an operational granularity.

20 Claims, 5 Drawing Sheets

MAINTAINING REAL-TIME CACHE COHERENCY DURING DISTRIBUTED COMPUTATIONAL FUNCTIONS

SUMMARY

Various embodiments of the present disclosure are generally directed to the maintenance of real-time coherency among multiple cache memories during distributed computational functions across a network.

In some embodiments, a source device, such as a host computer, is coupled via a network interface to a target device, such as a data storage device. A storage compute function (SCF) command is transferred from the source device to the target device. A local cache of the target device accumulates output data during the execution of the SCF over an execution time interval. Real-time coherency is maintained between the contents of the local cache and a client cache of the source device so that the client cache retains continuously updated copies of the contents of the local cache during execution of the SCF. The coherency can be carried out at a selected granularity, such as on a time-based granularity or an operational granularity.

These and other features which may characterize various embodiments can be understood in view of the following detailed discussion and the accompanying drawings.

DETAILED DESCRIPTION

Figure 1:
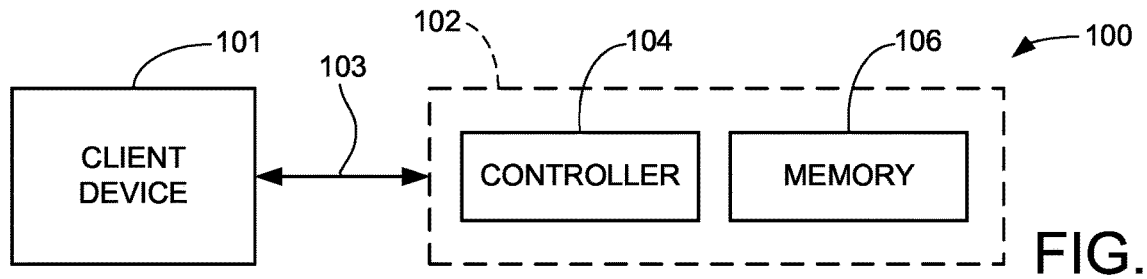
FIG. 1 provides a functional block representation of a system having a client (source) device coupled to a data storage (target) device constructed and operated in accordance with various embodiments.

Data storage devices store and retrieve computerized data in a fast and efficient manner. A data storage device usually includes a top level controller and a main memory store, such as a non-volatile memory (NVM), to store data associated with an client device. The NVM can take any number of forms, including but not limited to rotatable media and solid-state semiconductor memory.

Computer networks are arranged to interconnect various devices to enable data exchange operations. It is common to describe such exchange operations as being carried out between a client device and a data storage device. Examples of computer networks of interest with regard to the present disclosure include public and private cloud storage systems, local area networks, wide area networks, object storage systems, the Internet, cellular networks, satellite constellations, storage clusters, etc. While not required, these and other types of networks can be arranged in accordance with various industry standards in order to specify the interface and operation of the interconnected devices.

One commonly utilized industry standard is referred to as Non-Volatile Memory Express (NVMe), which generally establishes NVMe domains (namespaces) to expedite parallel processing and enhance I/O throughput accesses to the NVM memory in the network. Another standard is referred to as Compute Express Link (CXL) which enhances high speed central processing unit (CPU) to device and CPU to memory data transfers. Both NVMe and CXL are particularly suited to the use of Peripheral Computer Interface Express (PCIe) interfaces, although other types of interfaces can be used.

A current trend in present generation networks is the use of distributed processing techniques whereby data processing operations are carried out across multiple devices, including devices that are distributed over a large geographical area. For example, it can be advantageous for a client device to offload and distribute various computational functions among one or more local data storage devices to carry out mass computing operations and to aggregate the results of these operations to advance a desired result at a higher hierarchical level in the network.

Various embodiments of the present disclosure are generally directed to a method and apparatus for enhancing the efficiency and management of these and other types of distributed data processing operations in a network environment. As explained below, such operations, referred to herein as computational functions or storage compute functions (SCFs), are pushed from a higher level client device to a lower level local device. In some cases, the higher level client device may be a host device and the lower level local device may be a data storage device (e.g., an SSD, an HDD, a hybrid data storage device, etc.). Access to the results of the functions are maintained in real time at the client level. The initiating higher level client device is sometimes referred to as a source device, and the receiving lower level local is sometimes referred to as the target device.

Any number of different types of computational functions can be pushed by the source device to the target device. The computations can be carried out by any desired controllers including those of the source, target, or a different external device. The source device maintains control of the overall process and maintains a copy of the contents of one or more local caches of the target device involved in the distributed processing.

In some illustrated embodiments discussed below, a selected source device is interconnected over a suitable interface to one or more target devices in a network environment. The source device may be a client device such as a mass storage controller, a server, a user device, etc., and the target devices may be a data storage device, although other arrangements can be used. The interface may be PCIe based, and the device(s) may operate in accordance with the NVMe and/or CXL standards, although such constraints are merely illustrative and are not necessarily required.

During operation, an SCF command is forwarded from the source device to the target device. The command directs a controller to carry out an SCF. The command may be issued by a controller of the source device and processed by a controller of the target device.

The execution of the SCF results in the accumulation of output data in a local cache of the target device. The local cache constitutes a memory of the target device and may be arranged as a volatile or non-volatile memory of the target device. Real-time coherency is maintained between the local cache of the target device and a client cache of the source device using a cache coherency manager. The system is memory agnostic in that any number of different types of memory constructions can be used for the respective caches including but not limited to RAM, flash, disc, etc. The respective caches may have the same construction or may have different constructions.

The mirroring in real-time of the contents of the local cache to the client cache enables a controller associated with the source device to maintain access and control over the distributed processing operation during the execution of the SCF command. A selected granularity of the data mirroring is maintained during the SCF command processing. In some cases, a time-based granularity provides updates at selected times on a selected time scale interval. In other cases, an operation-based granularity provides updates each time an operation modifies the contents of the local cache. The output data may be forwarded to the client cache in slices via an existing interface or a specially configured interface. Additional processing can be applied to the slices including packetizing, encryption, etc.

In some cases, the controller of the source device inserts data into the local cache. The inserted data can be seed data that is used to initiate the accumulated data and/or otherwise utilized as part of the SCF command execution. In other cases, the inserted data can be intermediate data, such as results based on the ongoing execution of the compute function processing that are fed into the local cache. The seed data and the intermediate data can become incorporated into the final accumulated output data resulting from the SCF execution, or can be used to generate the final output data.

Once the output data are obtained, further processing is carried out as required, such as forwarding of the output data upstream in the network to a destination device, use of the output data by the source device to generate a final set of output data, a command to the target device to store the local copy of the output data to a main storage memory, and so on. In some cases, the output data in the local cache are immediately jettisoned, since a confirmed copy of the output data will be present in the client cache and this copy in the client cache can thereafter be used as desired, including transfer back to the target device for storage in the NVM thereof.

Any number of different types of SCFs can be executed using the principles of the present disclosure. The functions can include operations in which it is not necessary or desirable for the initiating source device to have access to the data stored by and/or accessed by the target device(s). This can enhance security aspects of the system, since the initiating source device is not privy to the underlying data used to generate the final output data.

In one non-limiting illustrative example, an SCF may be issued to access and evaluate clinical results of a drug trial in order to obtain high level efficacy result data. The individual data records of participants may be confidential information that should not be shared or accessed by unauthorized users. The information may be locally encrypted and not permitted to be transferred to any outside authority based on confidentiality protocols. In such case, it may be advantageous to distribute the generation operations to accumulate high level statistical information from such records without revealing protected confidential information of the individual participants, so that the analysis of such data is carried out locally and only the results are made available as the accumulated output data.

In another non-limiting illustrative example, an SCF may be issued that operates to perform an identification search of records of various databases using visual identification routines in order to locate records associated with a target image. As before, confidentiality or resource concerns may restrict the ability to access full records, but the use of distributed processing can provide concurrent access of many databases, such as those of governmental records, to identify a particular individual, group, document, object etc. that may correlate to the target image. It makes sense in this case to enable local devices to carry out such searching and provide lawfully produced results while still maintaining individual confidentiality of records.

There are many other situations apart from these where it may be useful to distribute SCFs to one or more distributed devices where it is either impractical or improper for the issuing source device to access directly the underlying data records in order to obtain the desired resulting output data. The particular type and style of SCF is not germane to the present disclosure, as any number and types of distributed computational functions can be used. What is of particular interest is the real-time coherency of the results of these and other types of distributed computations at the initiating source level; having real-time access to computations can be valuable in a number of ways including efficiency, security and comprehensibility. Being able to monitor and access in real-time the results of a given distributed operation can enhance the confidence in the resulting data and can expedite actions taken in view thereof.

These and other features and advantages of various embodiments can be understood beginning with a review of FIG. 1 which shows a functional block representation of a data processing network 100. The network 100 includes a client device 101 coupled to a data storage device 102 using a suitable interface 103. The client device 101 will sometimes be referred to herein as a source device and the data storage device 102 will sometimes be referred to herein as a target device. Other types of source and target devices can be used.

The client device 101 can take any number of desired forms including but not limited to a host device, a server, a RAID controller, a router, a network accessible device such as a tablet, smart phone, laptop, desktop, workstation, gaming system, other forms of user devices, etc. While not limiting, the client device 101 is contemplated as having at least one controller, which may include one or more hardware or programmable processors, as well as memory, interface electronics, software, firmware, etc. As described herein, programmable processors operate responsive to program instructions that are stored in memory and provide input instructions in a selected sequence to carry out various intended operations.

The data storage device 102 can take any number of desired forms including a hard disc drive (HDD), a solid-state drive (SSD), a hybrid drive, an optical drive, a thumb drive, a network appliance, a mass storage device (including a storage enclosure having an array of data storage devices), etc. Regardless of form, the data storage device 102 is configured to store user data provided by the client device 101 and retrieve such data as required to authorized devices across the network, including but not limited to the initiating client device 101 that supplied the stored data.

The data storage device 102 includes a main device controller 104 and a memory 106. The main device controller 104 can be configured as one or more hardware based controllers and/or one or more programmable processors that execute program instructions stored in an associated memory. The memory 106 can include volatile or non-volatile memory storage including flash, RAM, other forms of semiconductor memory, rotatable storage discs, etc. The memory can be arranged as a main store to store user data from the client device as well as various buffers, caches and other memory to store user data and other types of information to support data transfer and processing operations.

The interface 103 provides wired or wireless communication between the respective client and storage devices 101, 102, and may involve local or remote interconnection between such devices in substantially any desired computational environment including local interconnection, a local area network, a wide area network, a private or public cloud computing environment, a server interconnection, the Internet, a satellite constellation, a data cluster, a data center, etc. While PCIe is contemplated as a suitable interface protocol for some or all of the interconnections between the respective devices 101/102, such is not necessarily required.

Figure 2:
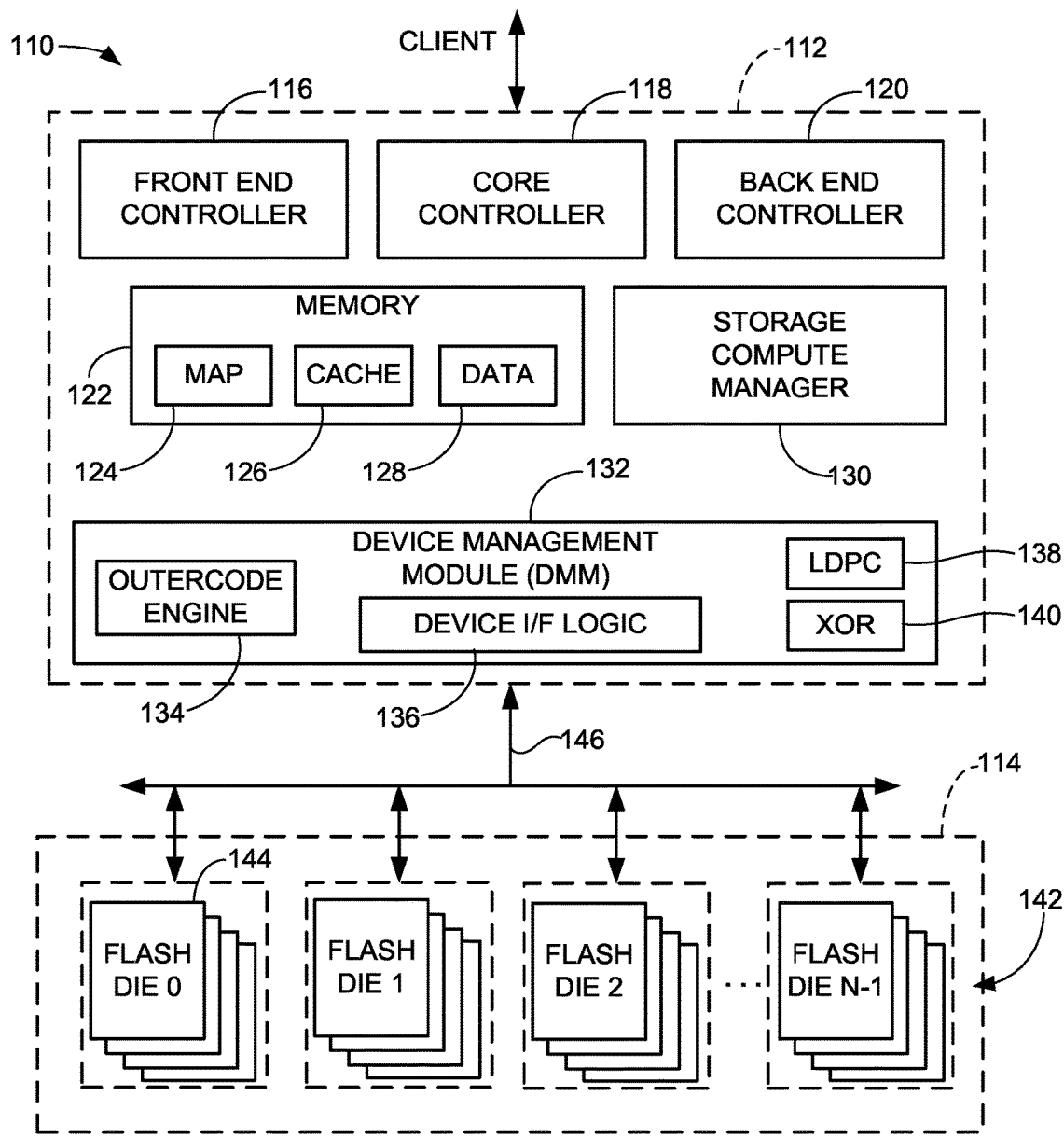
FIG. 2 shows aspects of the target device of FIG. 1 characterized as a solid state drive (SSD) in accordance with some embodiments.

FIG. 2 provides a functional block representation of a data storage device 110 that can be incorporated into the system 100 of FIG. 1 in some embodiments, including as the data storage device 102. The device 110 is characterized as a solid state drive (SSD) that communicates with one or more client devices via one or more Peripheral Component Interface Express (PCIe) ports. The NVM is contemplated as comprising NAND flash memory, although other forms of solid state non-volatile memory can be used. While not limiting, the SSD 110 can be configured to operate in accordance with the NVMe and/or CXL standards. Other standards can be used.

The SSD 110 includes a controller circuit 112 that generally corresponds to the controller 104 of FIG. 1, and a flash memory 114 that generally corresponds to the memory 106 in FIG. 1. The controller circuit 112 includes a front end controller 116, a core controller 118 and a back end controller 120. The front end controller 116 performs client (host) I/F functions, the back end controller 120 directs data transfers with the memory module 114 and the core controller 118 provides top level control for the device 110.

Each controller 116, 118 and 120 includes a separate programmable processor with associated programming (e.g., firmware, FW) in a suitable memory location, as well as various hardware elements to execute data management and transfer functions. This is merely illustrative of one embodiment; in other embodiments, a single programmable processor (or less/more than three programmable processors) can be configured to carry out each of the front end, core and back end processes using associated FW in a suitable memory location. Multiple programmable processors can be used in each of these operative units. A pure hardware based controller configuration, or a hybrid hardware/programmable processor arrangement can alternatively be used. The various controllers may be integrated into a single system on chip (SOC) integrated circuit device, or may be distributed among various discrete devices as required.

A controller memory 122 represents various forms of volatile and/or non-volatile memory (e.g., SRAM, DDR DRAM, flash, etc.) utilized as local memory by the controller 112. Various data structures and data sets may be stored by the memory including one or more metadata map structures 124, one or more sets of cached data 126, and one or more sets of user data 128 pending transfer between the SSD 110 and a client device (e.g., 101, FIG. 1). Other types of data sets can be stored in the memory 122 as well.

A compute function manager circuit 130 is provided as described below to manage various storage compute functions (SCFs) carried out by the SSD 110. The circuit 130 can be a standalone circuit or can be incorporated into one or more of the programmable processors of the various controllers 116, 118, 120.

A device management module (DMM) 132 supports back end processing operations. The DMM 132 includes an outer code engine circuit 134 to generate outer code, a device I/F logic circuit 136 to provide data communications, and a low density parity check (LDPC) circuit 138 configured to generate LDPC codes as part of an error detection and correction strategy used to protect the data stored by the by SSD 110. One or more XOR buffers 140 are additionally incorporated to temporarily store and accumulate parity data during data transfer operations.

The memory module 114 includes an NVM in the form of a flash memory 142 distributed across a plural number N of flash memory dies 144. Rudimentary flash memory control electronics (not separately shown in FIG. 2) may be provisioned on each die 144 or for groups of dies to facilitate parallel data transfer operations via a number of channels (lanes) 146.

Figure 3:
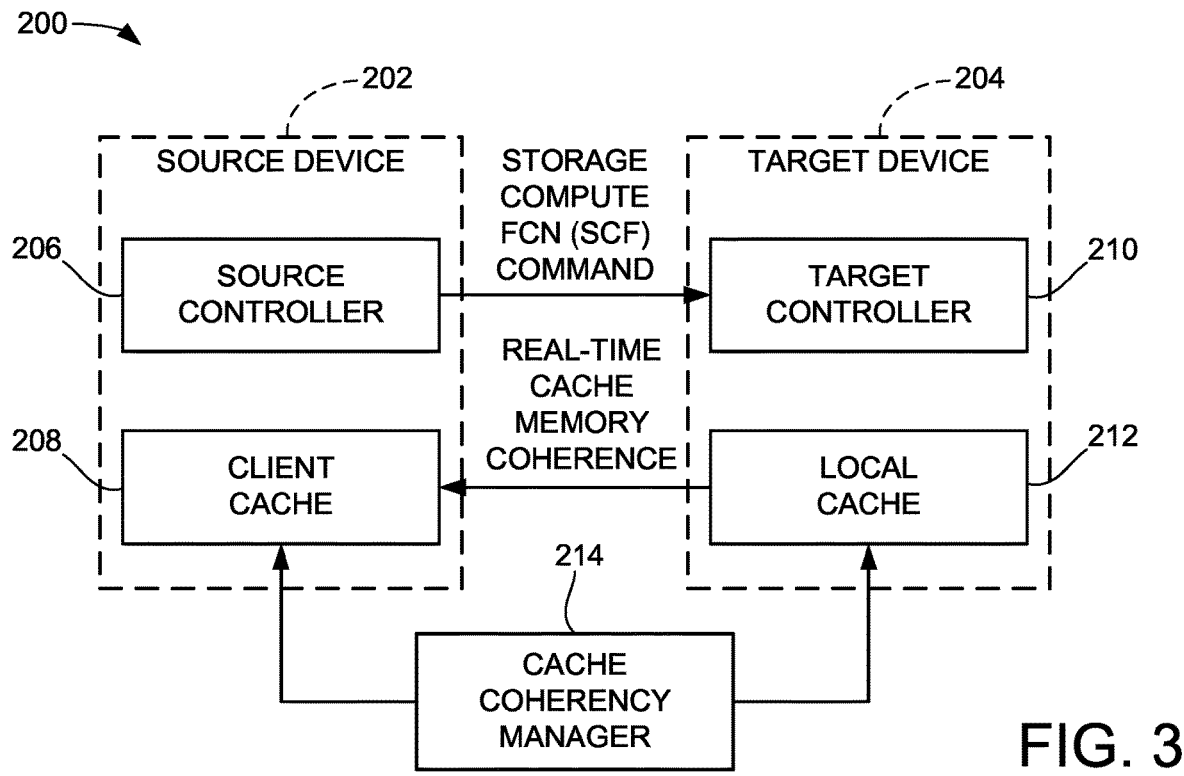
FIG. 3 shows another arrangement of a source device and a target device in some embodiments.

FIG. 3 is a functional block representation of a portion of a computer network system 200 arranged to operate in accordance with some embodiments. The system 200 includes a source device 202 coupled to a target device 204. It is contemplated that the source device 202 corresponds to a client device such as at 101 in FIG. 1 and the target device 204 corresponds to a data storage device such as 102, 110 in FIGS. 1-2. Other configurations can be used including source devices that are not necessarily characterized as host devices and target devices that are not necessarily characterized as data storage devices. As such, it will be noted that the term "storage compute function" does not necessarily require the target device be a data storage device, although in many cases this may be a particularly efficient arrangement.

The source device 202 includes a source controller 206 and a client cache 208. The target device 204 includes a target controller 210 and a local cache 212. The controllers 206, 208 may take the form of the various controllers discussed above including hardware and/or programmable processors. The caches 208, 212 may take the form of volatile or non-volatile memory including RAM, flash, FeRAM, STRAM, RRAM, phase change RAM, disc media cache, etc. An SOC (system on chip) approach can be used so that the respective caches are internal memory within a larger integrated circuit package that also incorporates the associated controller. Alternatively, the caches may be separate memory devices accessible by the respective controllers.

During operation of the system of FIG. 3, the source controller 206 issues a storage compute function (SCF) command to the target controller 208 in order to carry out a corresponding SCF locally at the target device level. As noted previously, it will be understood that the SCF can constitute substantially any number of different types of functions or operations as required.

The execution of the SCF may involve the execution of program instructions in a memory of or accessible by the target device, such as in the form of an application (app), a firmware (FW) routine, a script, a container, an object, etc. The program instructions may be transferred to the target device 204 as part of the command, the program instructions may be previously stored and resident in the local memory of the target device, the program instructions may be stored in a different device that is accessed responsive to the command, etc.

The execution of the SCF results in the accumulation of output data in the local cache 212 during an execution time interval associated with the SCF. During the accumulation of the output data, a cache coherence manager 214 maintains real-time cache memory coherence between the local cache 212 and the client cache 208. The cache coherency manager 214 can be incorporated into the source device 202, the target device 204, in both the source and target devices, or can be arranged as a separate device coupled to the respective source and target devices. In some cases, the cache coherency manager 214 can form a portion of the functionality of one or both of the respective controllers 206, 210.

Figure 4:
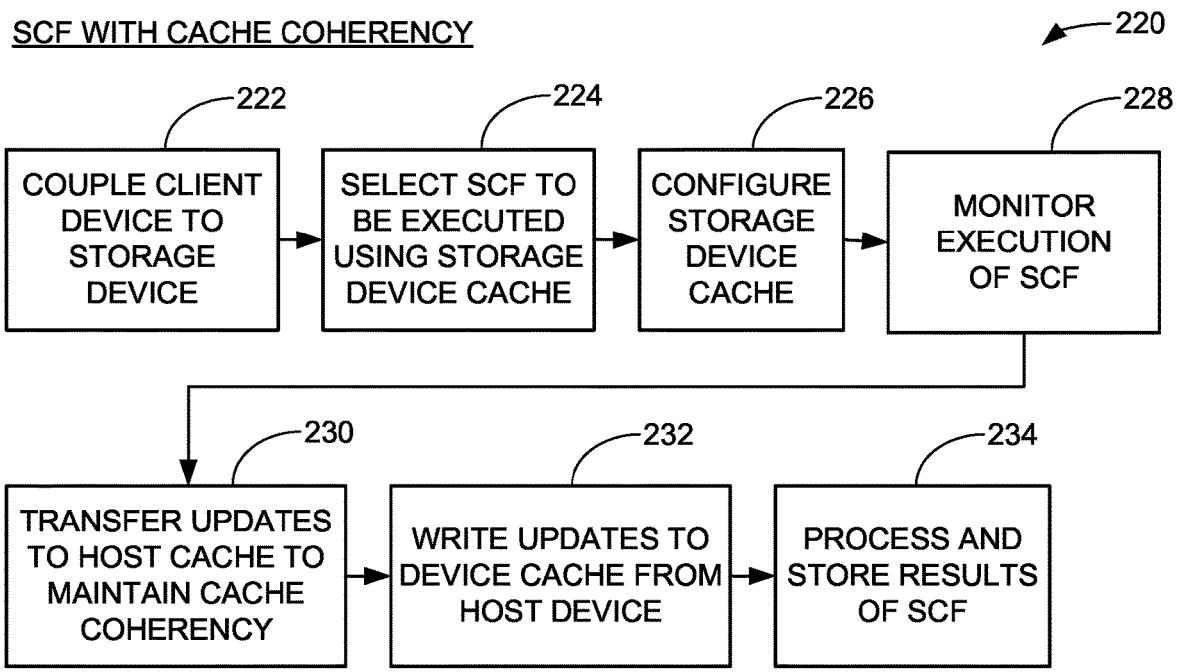
FIG. 4 is a flow diagram of functional steps that can be taken by the system of FIG. 3 in some embodiments.

FIG. 4 provides a flow diagram 220 to describe the operation of the system 200 of FIG. 3 in the context of a client computer device and an associated data storage device. The respective devices are initially coupled at block 222, such as via a network interface connection. An SCF is selected by the controller of the client device and an associated command is issued to execute the selected SCF at block 224. As required, the local (storage device) cache is configured to accommodate the execution of the SCF by the controller of the storage device, block 226. This can include allocation of an appropriate amount of memory to be used during SCF execution, the loading of seed data to the local cache by the source controller, etc.

The SCF proceeds with execution at block 228. This execution is monitored by the cache coherency manager 214 in FIG. 3. At suitable intervals, the accumulated contents of the local cache are mirrored into the client cache at block 230 in the form of slices (snapshots) of data that are transferred so that the client cache maintains an up-to-date, real-time copy of the contents of the local cache. As required, intermediate data may be supplied directly to the local cache by the client device during the continued execution of the SCF, block 232. Such updates can be generated before, during and/or after the execution of the SCF. At the conclusion of the SCF execution period, the results are processed by the storage device and/or the client device, block 234.

Figure 5:
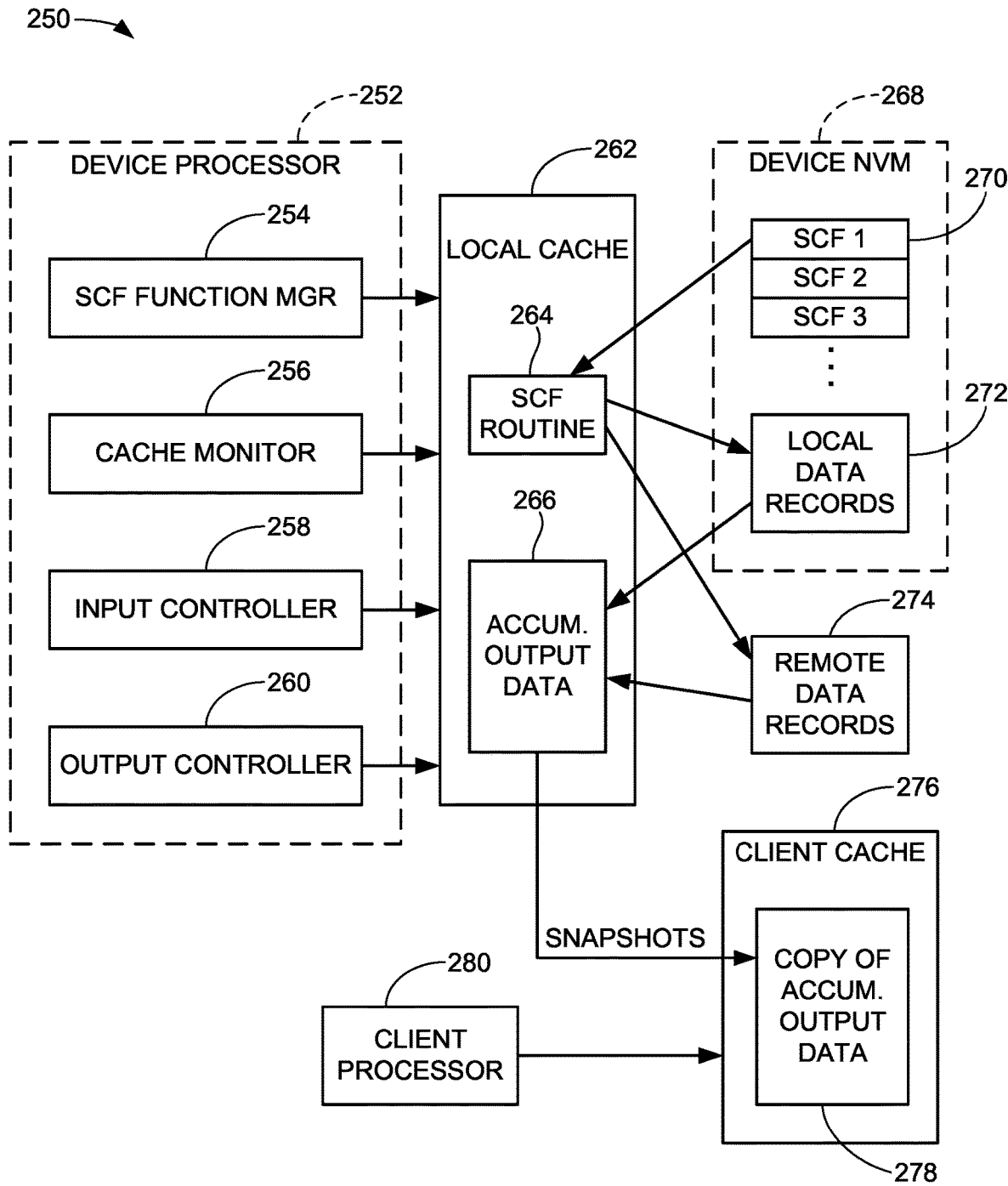
FIG. 5 shows another arrangement of a source device and a target device in some embodiments.

FIG. 5 shows another system 250 similar to the system 200 of FIG. 3 in accordance with some embodiments. A device processor 252 incorporates various functional block circuits including an SCF function manager 254, a cache monitor 256, an input controller 258 and an output controller 260, all of which are operably coupled to a local cache 262.

The SCF function manager 252 controls the selection, loading and operation of the selected SCF being executed, which is denoted at 264. In this example, it is contemplated that the SCF routine (program instructions) 264 will be loaded to the local cache 262 for ready access by the associated processor, although such is not necessarily required; any suitable memory location can be used.

The cache monitor 256 monitors the accumulation of the output data, denoted at 266, during execution of the selected SCF routine. The input controller 258 generally controls inputs supplied to the cache 262, and the output controller 260 generally controls outputs from the cache 262.

A device NVM is denoted at 268, and this can be used to store and supply various SCF routines 270 for loading to the local cache 262, as well as storing and supplying user data such as local data records 272 that can be retrieved and acted upon to generate the accumulated output data 266. Using the example SSD 110 from FIG. 2, the device processor 252 can be incorporated into the storage compute manager circuit 130, the cache 262 can form a portion of the local memory 122, and the device NVM 268 can form a portion of the flash memory 114. In some cases, external data such as in the form of remote data records 274 resident in an external location, such as a different data storage device or other external device, can additionally or alternatively be accessed and retrieved by the executed SCF. While not shown in FIG. 5, the SCF routine can likewise be supplied from an external device.

A client cache 276 similar to the cache 208 (FIG. 3) maintains a copy of the accumulated output data. This copy of the accumulated data is denoted at 278 for access and use by a client processor 280. The data are forwarded in slices, or snapshots, as shown so that the contents of the cache 278 are continuously updated to mirror that of the data at 266 in the cache 262.

Figure 6:
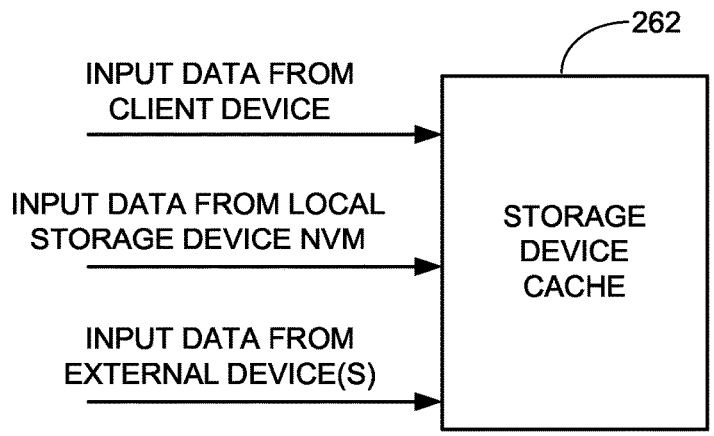
FIG. 6 shows various inputs that can be provided to a local cache of a target device in some embodiments.

FIG. 6 shows aspects of the operation of the processor 252 of FIG. 5 to load data to the local cache 262. This can include the loading of input data from the client device, input data from the local NVM, and input data from one or more external devices including data from other data storage devices. The input data from the client device can include the aforementioned seed data to initiate the SCF processing or the intermediate data obtained during the execution of the SCF. The input data from the local storage device NVM can be data records retrieved from the local NVM (e.g., memories 114, 268). The input data from external devices can include data from other external data storage devices associated with the storage device housing the storage device cache 262.

Figure 7:
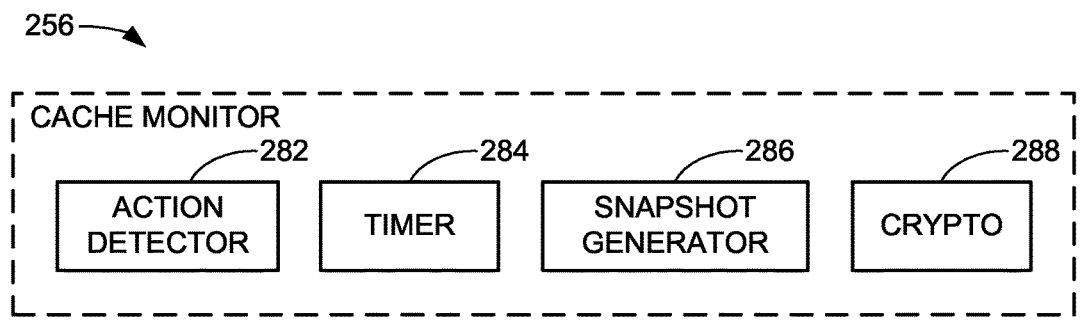
FIG. 7 shows an arrangement of a cache monitor of various embodiments.

FIG. 7 is a functional representation of the cache monitor circuit 256 from FIG. in some embodiments. Other arrangements can be used. The cache monitor circuit 256 monitors the ongoing operation of the selected SCF routine and provides an interface to the commanding source to monitor the ongoing operation of the SCF routine at the cache level (e.g., as the accumulated output data are generated, but this also includes monitoring of the SCF in action). As such, the cache monitor circuit 256 can be configured to include an action detector circuit 282 that monitors execution of the SCF routine, either directly or indirectly; it is not necessarily required that the monitor circuit observes the specific operations so long as the monitor circuit at least detects, at a reasonable granularity, write operations to update the cache.

The cache monitor circuit 256 further includes a timer 284, which can be realized in any number of forms but ultimately operates to measure and monitor the progress of the executed SCF routine. In some cases, the timer may be a counter circuit that is configured based on a clock input timing signal or other control input to denote particular time intervals during the execution of the SCF routine, in which case actions may be taken at the conclusion of each interval that makes up the overall duration of the execution of the SCF routine.

A snapshot generator circuit 286 can also be incorporated into the cache monitor circuit 256. The snapshot generator circuit 286 can be configured to take snapshots of the ongoing data in the local cache. These snapshots can be a complete image of the data in the cache or can be a representation of updates since the last snapshot. Regardless, the snapshots obtained by the circuit 286 can be viewed as slices that represent, either directly or indirectly, the contents of the local cache at the associated time at which the snapshot is generated.

A crypto block circuit 288 is provided as needed. Cryptographic techniques are well known and so a detailed description is not necessary to understand aspects and operation of the various embodiments presented herein. Nonetheless, in at least some cases it may be advisable to subject the various snapshots generated by the snapshot generator circuit 286 to various cryptographic techniques by the crypto block 288 prior to transmission of the updated data across the interface that connects the target device to the source device. Examples include but are not limited to encryption (including public/private key encryption, symmetric encryption utilizing secret encryption keys, etc), digital signatures, HMACs (hash-based message authentication codes), blockchain ledgers, etc. These and other forms of cryptographic functions can be used to protect and authenticate the data transferred between the local cache and the client cache during and after the execution of the SCF routine. These and other techniques can also be used to detect unauthorized tampering with the contents of the local cache.

Figure 8:
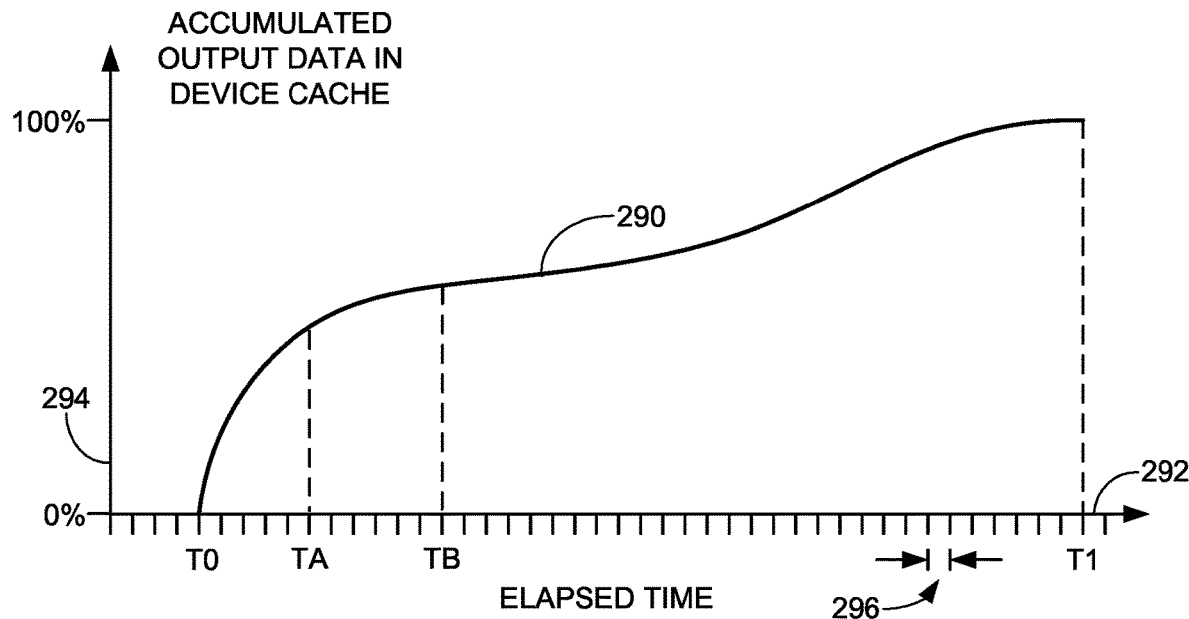
FIG. 8 is a graphical representation of accumulated output data in some embodiments.

FIG. 8 shows a data accumulation curve 290 plotted against an elapsed time x-axis 292 and an accumulated data y-axis 294 in some embodiments. The shape of the curve 290 will depend upon the particular SCF routine being executed by a particular target device. Nonetheless, it will be appreciated that a given SCF routine, once executed, will result in the accumulation of a quantity of accumulated output data in the local cache over a selected execution interval. With reference to FIG. 8, it can be seen that the execution of the SCF begins at an arbitrary first time T0 and concludes at an arbitrary second time T1. Stated another way, the execution of the selected SCF routine (e.g., 264, FIG. 5) results in the accumulation of the output data (e.g., 266, FIG. 5) over the execution time interval from T0 to T1. The rate of accumulation is not important and will vary based on the circumstances, but the amount of accumulated output data will be different at different time intervals, such as denoted in FIG. 8, during the execution time interval.

Referring again to FIGS. 3 and 5, it can be seen that the contents of the local cache (accumulated data in FIG. 8) are mirrored in real-time to the client cache. This mirroring operation can be carried out using various granularities. In some cases, a time-based granularity is used so that the time interval from T0 to T1 is divided into a sequence of sub-intervals as shown in FIG. 8 at 296. In such case, at the conclusion of each sub-interval, a snapshot of the contents of the local cache is forwarded to the source device to be placed into the client cache.

For example, as shown in FIG. 8, at time TA the contents of the cache at this time are forwarded to the client cache. At time TB, the contents of the cache at this time are similarly forwarded to the client cache. Similar transfers can be provided at each of the designated index marks along the x-axis.

In some cases, the data transferred at time TA can be a complete image (cryptographically protected as required) of the local cache, and the data transferred at time TB can similarly be a complete image that overwrites the previous image. In other cases, each snapshot constitutes only the differences from the previous time index point so such can be overwritten and added to the client cache, so that the data sent at TA are only those that have changed since the most immediately preceding time index, and the data sent at TB are only those that have changed since the most immediately preceding time index. Other arrangements can be used.

In at least some embodiments, the execution time interval commences at time T0 with receipt of the SCF command and concludes at time T1 with the execution of the last programming instruction in the set of program instructions in the associated SCF. Stated another way, the execution time interval can be viewed as extending over an ongoing period of time during which the output data are sequentially generated and placed into the local cache. The output data can be viewed as a partial output data set that changes during this time until the conclusion of the SCF routine, at which the output data will constitute a complete output data set and no further changes are made. As such, it follows that multiple transfers will be necessary during the execution time interval to achieve the real-time coherency by associated transfers of the partial output data sets (or portions thereof), rather than a single transfer of the complete output data set. A follow-up transfer of the complete data set after the conclusion of the execution time interval can be additionally carried out if desired, as discussed below.

Figure 9:
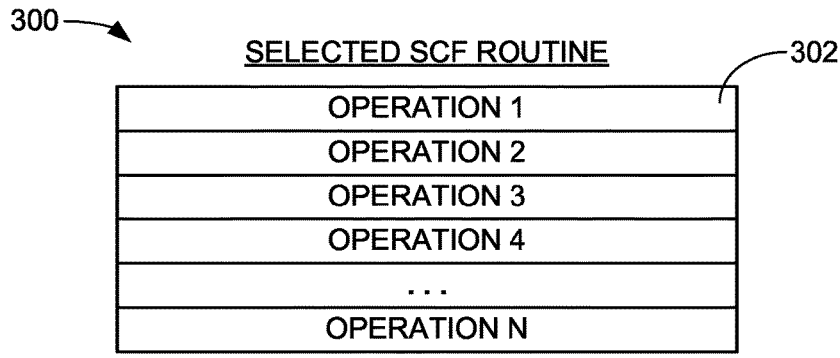
FIG. 9 shows aspects of a selected compute function routine in accordance with some embodiments.

FIG. 9 shows aspects of a selected SCF routine 300 that may be executed in accordance with the foregoing discussion. The selected SCF routine 300 includes various operations 302 that are carried out in a selected sequence in order to obtain the desired output data. It will be noted from FIG. 9 that a number of operations are carried out in a selected sequence. These operations are denoted at 302 and are identified as operations 1-N, where N is a plural integer. These operations may be any form of operation including but not limited to read operations, write operations, cryptographic transformation operations, operands, calculations, search operations, compare operations, computational operations, authentication operations, etc.

The system operates such that the SCF transferred to the target device results in the access and manipulation of data accessible to the target device and a number of operations (including operands) will be carried out to generate the output data. As noted above, the real-time coherency of the contents of the local cache to the client cache can be carried out on a time basis (e.g., at the conclusion of each time slice such as denoted at 296 using a time-based granularity) or can be carried out on an operational basis (e.g., at the conclusion of each operation 302 using an operation-based granularity).

Figure 10:
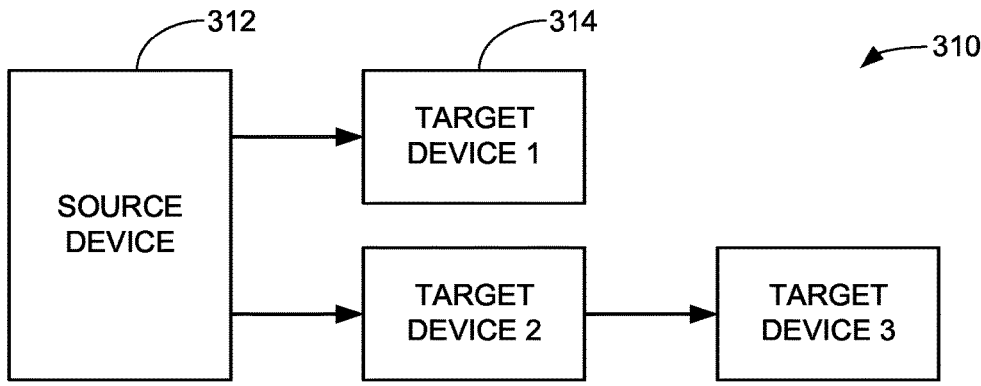
FIG. 10 shows another arrangement of a source device and multiple target devices in some embodiments.

FIG. 10 provides another system 310 in accordance with some embodiments. The system includes a source device 312 that is coupled to multiple target devices 314, denoted as target devices 1-3. Other numbers of source and target devices can be used. It will be apparent that some computational functions may be directed by the source device 312 to a first target device (target device 1) and other computational devices may be directed by the source device 312 to a second target device (target device 2) which in turn provides inputs to perform computational functions by a third target device (target device 3). In this way, the distributed functions can be hierarchical and involve multiple levels of computations, provided that the initiating source has a cache that maintains a real-time copy of the data being generated by the associated target devices.

Figure 11:
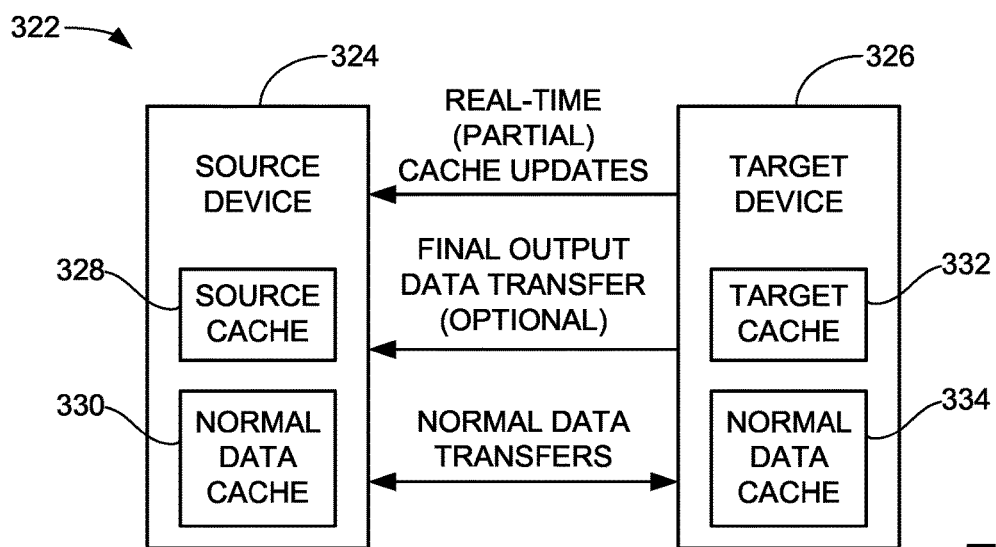
FIG. 11 shows another system to demonstrate operation of a source device and a target device in accordance with some embodiments.

FIG. 11 provides another system 320 similar to the various systems described above, and includes a source device 324 and a target device 326. The source device includes various elements including a source cache 328 and a normal data cache 330. The target device similarly includes various elements including a target cache 330 and a normal data cache 332.

The source cache 328 operates as before to maintain a continuously updated copy of the accumulated output data (e.g., partial output data sets) in the target cache 332 during the execution time interval of the associated SCF. As shown in FIG. 11, these correspond to the "real time (partial) cache updates" denoted between the respective devices. After the conclusion of the execution time interval for the associated SCF, the complete output data set can be retained in the target cache 332 for any selected amount of time, such as until the cache space is needed for a new process. During this time, as desired a follow-up transfer of the complete output data set (e.g., the completed accumulated output data) can be optionally transferred to the source device (or any other desired device) as shown by the "final output data transfer (optional)" transfer in FIG. 11.

Such transfers are to be distinguished from "normal data transfers" that are carried out between the respective normal data caches 330, 334 of the respective source and target devices 324, 326. These latter transfers are so-called normal transfers of data and commands between the respective devices, such as in the context of read and write commands to transfer user data between the source device (such as a host device) and the target device (such as a data storage device). Each of the various types of transfers can be carried out via the same interface, or separate interfaces can be used. Similarly, during the ongoing execution of the SCF routine the target device may operate to service, in parallel, such normal transfers (e.g., host read/write commands, etc.).

Various embodiments of the present disclosure can now be understood as providing a number of benefits over the prior art, including the ability to maintain a real-time copy of the contents of one or more distributed caches used during the execution of distributed functions.

It is to be understood that even though numerous characteristics and advantages of various embodiments of the present disclosure have been set forth in the foregoing description, together with details of the structure and function of various embodiments of the disclosure, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. A method comprising:
transferring, from a source device to a target device, a storage compute function (SCF) command to initiate execution of an associated SCF;
using a local cache of the target device to accumulate output data over an execution time interval responsive to the execution of the associated SCF, the execution time interval commencing with receipt of the SCF command and concluding with conclusion of the execution of the associated SCF; and
maintaining real-time coherency between the local cache and a client cache of the source device so that the accumulated output data in the local cache are mirrored in real-time to the client cache during an entirety of the execution time interval.

2. The method of claim 1, wherein the execution of the SCF comprises a transfer of data from a main memory store of the target device to the local cache during the execution time interval.

3. The method of claim 1, wherein the execution of the SCF comprises a transfer of data from the client cache to the local cache during the execution time interval.

4. The method of claim 1, wherein the execution of the SCF is carried out via execution of a set of programming instructions by a programmable processor over the execution time interval so that the execution time interval concludes upon execution of a last programming instruction in the set of programming instructions by the programmable processor.

5. The method of claim 1, wherein the associated SCF is characterized as a set of programming instructions stored in a non-volatile memory (NVM) of the target device.

6. The method of claim 5, wherein the source device transfers the set of programming instructions to the target device prior to the transfer of the SCF command from the source device to the target device.

7. The method of claim 1, wherein the output data are accumulated in the local cache over a selected period of time associated with the execution of the SCF, and wherein snapshots of the output data are obtained and transferred to the source cache by the target device during the selected period of time.

8. The method of claim 7, wherein each of the snapshots is subjected to a cryptographic function prior to transfer, via a data interface, from the target device to the source device.

9. The method of claim 7, wherein the execution of the SCF comprises execution of a sequence of operations in a selected order, and wherein each of the snapshots is generated responsive to execution of a different one of the operations in the sequence of operations.

10. The method of claim 7, wherein the selected period of time is subdivided into a sequence of subintervals that collectively make up the selected period of time, and wherein each of the snapshots is generated at a conclusion of each of the time intervals in the sequence of time intervals.

11. The method of claim 1, wherein the source device is a client device having a client programmable processor and a local memory characterized as the client memory, wherein the target device is a data storage device having a data storage device programmable processor and a main data store memory characterized as a non-volatile memory, wherein the local memory is a local data cache of the data storage device, wherein the SCF command is transferred by the client programmable processor, and wherein the data storage device programmable processor executes the SCF.

12. An apparatus comprising:
a client device having a client processor and a client cache; and
a storage device coupled to the client device via a data interface and having a device processor and a device cache; wherein
the device processor is configured to execute a storage command function (SCF) to accumulate output data in the device cache over an execution time interval responsive to an SCF command received from the client processor, and
the client processor is configured to maintain real-time coherency between the output data in the device cache and a copy of the output data in the client cache during the execution time interval.

13. The apparatus of claim 12, wherein snapshots of the output data are obtained and transferred to the client cache by the storage device during the execution time interval.

14. The apparatus of claim 13, wherein the execution of the SCF comprises execution of a sequence of operations in a selected order, and wherein each of the snapshots is generated responsive to execution of a different one of the operations in the sequence of operations during the execution time interval.

15. The apparatus of claim 13, wherein the execution time interval is subdivided into a sequence of subintervals that collectively make up the execution time interval, and wherein each of the snapshots is generated at a conclusion of each of the subintervals in the sequence of subintervals.

16. The apparatus of claim 13, wherein each of the snapshots is subjected to a cryptographic function prior to transfer, via a data interface, from the storage device to the client device.

17. A data storage device comprising:
- a non-volatile memory (NVM) configured as a main memory store;
- a local cache; and
- a controller configured to, responsive to receipt of a storage compute function (SCF) command from a client device coupled to the data storage device via an interface, execute an associated SCF to accumulate output data in the local cache using data stored in the NVM and to provide real-time updates of snapshots of the accumulated output data in the local cache to a client cache of the client device during the execution of the SCF.

18. The data storage device of claim 17, wherein the snapshots represent time slices of changes in contents of the local cache at each of a succession of time slices during the execution of the SCF command.

19. The data storage device of claim 17, wherein the snapshots represent changes in contents of the local cache at each of a succession of operations carried out during the execution of the SCF command.

20. The data storage device of claim 17, wherein the associated SCF comprises program instructions stored in the NVM and transferred to the local cache for execution by the controller.

\* \* \* \* \*